US00RE38396E

(19) United States
(12) Reissued Patent
Gellert

(10) Patent Number: US RE38,396 E
(45) Date of Reissued Patent: Jan. 27, 2004

(54) METHOD OF MAKING INJECTION MOLDING COOLED THREAD SPLIT INSERTS

(76) Inventor: Jobst Ulrich Gellert, 7A Price Street, Georgetown, Ontario (CA), L7G 2X1

(21) Appl. No.: 09/922,594

(22) Filed: Aug. 3, 2001

Related U.S. Patent Documents

Reissue of:
(64) Patent No.: 5,930,882
Issued: Aug. 3, 1999
Appl. No.: 09/134,952
Filed: Aug. 17, 1998

(30) Foreign Application Priority Data

Jul. 29, 1998 (CA) ..... 2244511

(51) Int. Cl.[7] ..... B23P 17/00
(52) U.S. Cl. ..... 29/411; 29/415; 29/416; 29/527.6; 228/171; 425/526; 425/533; 425/548
(58) Field of Search ..... 29/411, 527.5, 29/527.6, 415, 416; 425/526, 533, 547, 548; 228/171

(56) References Cited

U.S. PATENT DOCUMENTS

| | | | | |
|---|---|---|---|---|
| 4,187,595 | A | 2/1980 | Kuhn, Jr. | 29/157 C |
| 4,557,685 | A | 12/1985 | Gellert | 425/549 |
| 4,969,263 | A | 11/1990 | Adams | 29/527.6 |
| 5,096,411 | A | 3/1992 | Gellert | 425/547 |
| 5,443,381 | A | 8/1995 | Gellert | 425/549 |
| 5,599,567 | A | 2/1997 | Gellert | 425/526 |

FOREIGN PATENT DOCUMENTS

GB 2240300 7/1991

OTHER PUBLICATIONS

Tanaka Kisaburo, "Manufacture of Mold," 3/90, Patent Abstract of Japan vol. 015, No. 061.

*Primary Examiner*—P. W. Echols
(74) *Attorney, Agent, or Firm*—Sterne, Kessler, Goldstein & Fox P.L.L.C.

(57) ABSTRACT

A method of making pairs of thread splits inserts used to injection mold bottle preforms. Machining a hollow outer part of the pair of thread split inserts with an opening therethrough and outer portions of two cooling conduits extending from the opening therethrough to respective inlets and outlets. Making an inner part of the pair of thread split inserts by injection molding a ceramic core with the required shape and investment casting the inner part around the ceramic core. The outer surface of the inner part having grooves to partially form inner portions of the two cooling fluid conduits. Then machining the cast inner part to fit in the opening through the outer part. Mounting the outer part around the inner part with the inner and outer portions of the two cooling fluid conduits aligned. Applying brazing material between the inner and outer parts and heating them in a vacuum furnace to integrally braze them together. Finally, cutting the integral inner and outer parts in half to form the pair of thread split inserts with each of the thread split inserts having one of the cooling fluid conduits therein.

5 Claims, 6 Drawing Sheets

METHOD OF MAKING INJECTION MOLDING COOLED THREAD SPLIT INSERTS

Matter enclosed in heavy brackets [ ] appears in the original patent but forms no part of this reissue specification; matter printed in italics indicates the additions made by reissue.

BACKGROUND OF THE INVENTION

This invention relates a method of making pairs of cooled thread split inserts used to injection mold bottle preforms.

As seen in the applicant's U.S. Pat. No. 5,599,567 which issued Feb. 4, 1997, it is well known to use a pair of thread split inserts in a mold to form the threaded neck portion of a PET bottled preform. The neck portion of the preform also has a ring collar which is used to eject the preform from the mold. The thread split inserts have conduits through which cooling fluid is circulated to cool the neck portion of the preform prior to ejection.

In the past, thread split inserts have been made by machining steel upper and lower parts and then integrally brazing them together. This method has the disadvantage that both parts must be machined to provide cooling fluid conduits and threads and this is time consuming and therefore relatively costly.

SUMMARY OF THE INVENTION

Accordingly, it is an object of the present invention to at least partially overcome the disadvantages of the prior art by providing a method of making cooled thread split inserts wherein an inner part which fits in an outer part is made by casting rather than machining.

To this end, in one of its aspects, the invention provides a method of making a pair of thread split inserts used in injection molding elongated hollow bottle preforms. Each preform has a neck portion with an outer surface forming a ring collar and threads extending between an open end and the ring collar. Each thread split insert has a front end, a rear end and first and second flat inner aligned faces extending on opposite sides of a curved inner surface. The thread split inserts are mounted together in a mold with the respective flat inner faces of the thread split inserts abutting, wherein the curved inner surfaces of the thread split inserts combine to form an opening therethrough shaped to mold the outer surface of the neck portion of the preform. The curved inner surfaces of the thread split inserts each have a semicircular groove to form the ring collar and a threaded portion extending between the semicircular groove and the rear end to form the threads. The method comprises the steps of injection molding a ceramic core having a predetermined shape and then casting wax around the ceramic core in the shape of an inner part of the pair of thread split inserts. Then investment casting a suitable metal in a mold to replace the wax around the ceramic core to form a hollow inner part of the pair of thread split inserts extending around a central longitudinal axis. The inner part has a generally cylindrical outer surface with grooves therein to partially form inner portions of two cooling fluid conduits. Each cooling fluid conduit extends around the curved inner surface of one of the thread split inserts. Then machining the cast inner part to make the outer surface a predetermined size. Making a hollow outer part of the pair of thread split inserts of a suitable metal having a predetermined shape with an opening therethrough having an inner surface which fits around the outer surface of the inner part and outer portions of the two cooling conduits extending from the opening therethrough to respective inlets and outlets. Mounting the outer part around the inner part with the inner and outer portions of the two cooling fluid conduits aligned. Then applying brazing material between the inner part the outer part and heating the assembled inner part and outer part in a vacuum furnace to integrally braze the inner part and the outer part together. Cutting the integral inner and outer parts in half along the central longitudinal axis to form the pair of thread split inserts, with each of the thread split inserts having one of the cooling fluid conduits therein.

Further objects and advantages of the invention will appear from the following description taken together with the accompanying drawings.

DETAILED DESCRIPTION OF THE INVENTION

Figure 1:
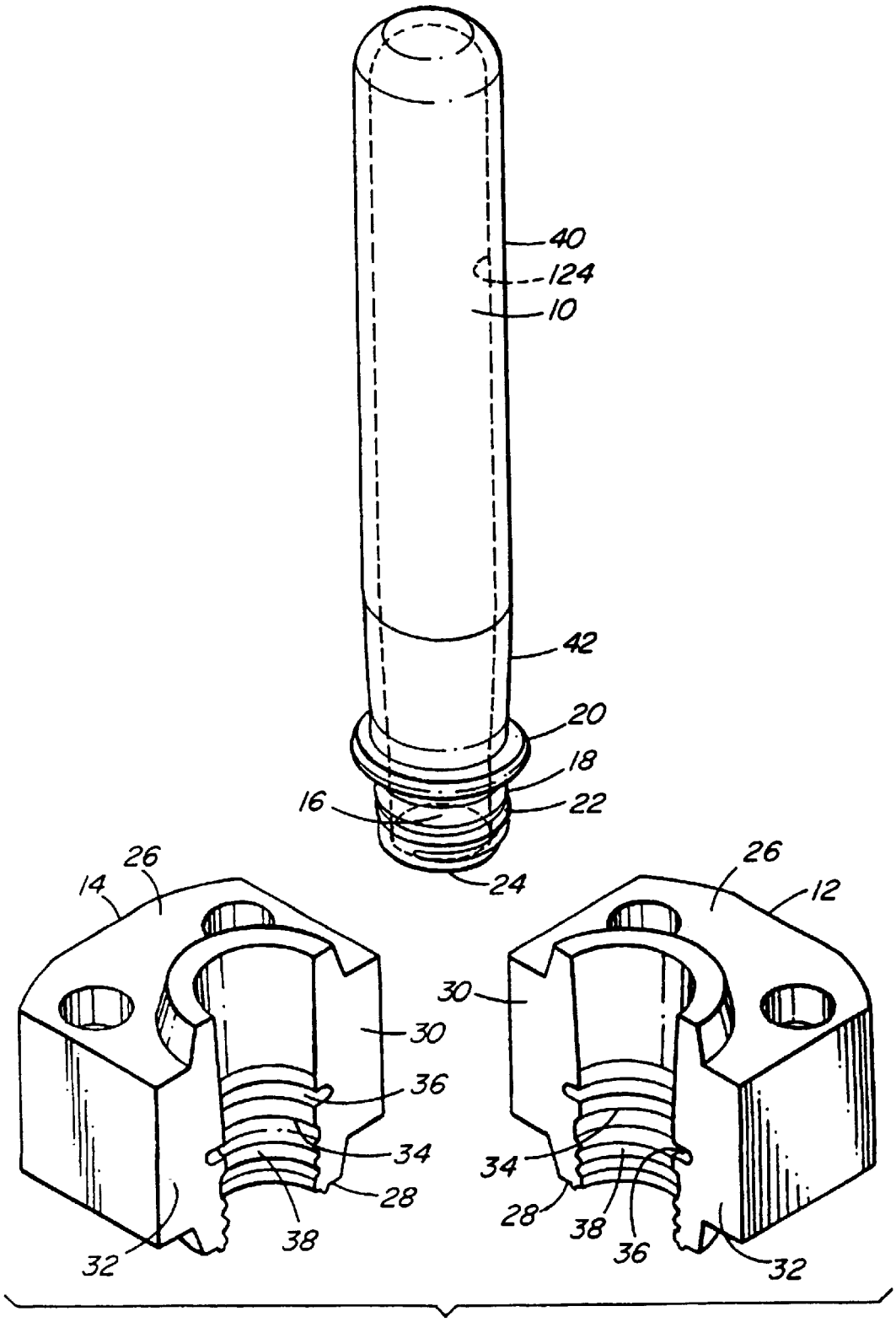
FIG. 1 is an isometric view showing a bottle preform and a pair of thread split inserts made according to a preferred embodiment of the invention.

Reference is first made to FIG. 1 which shows a bottle preform 10 and a pair of thread split inserts 12, 14 made according to a preferred embodiment of the invention. As can be seen, the bottle preform 10 is hollow and is elongated to a selected length. The bottle preform 10 has a neck portion 16 with an outer surface 18 forming a ring collar 20 and threads 22 extending between an open end 24 and the ring collar 20. The bottle preform 10 is injection molded of polyethylene terephthalate (PET) according to a conventional injection molding cycle in a conventional mold.

Figure 13:
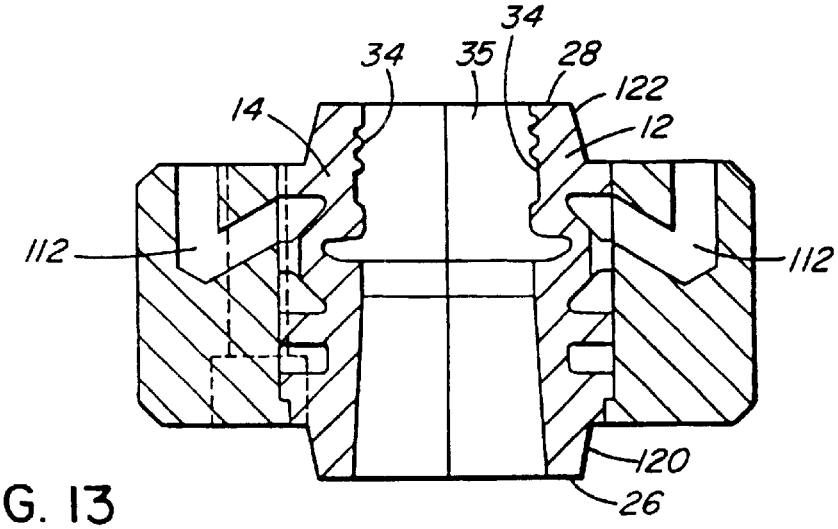
FIG. 13 is a sectional view of the completed pair of thread split inserts in FIG. 12 after grinding the outer surfaces.
Figure 14:
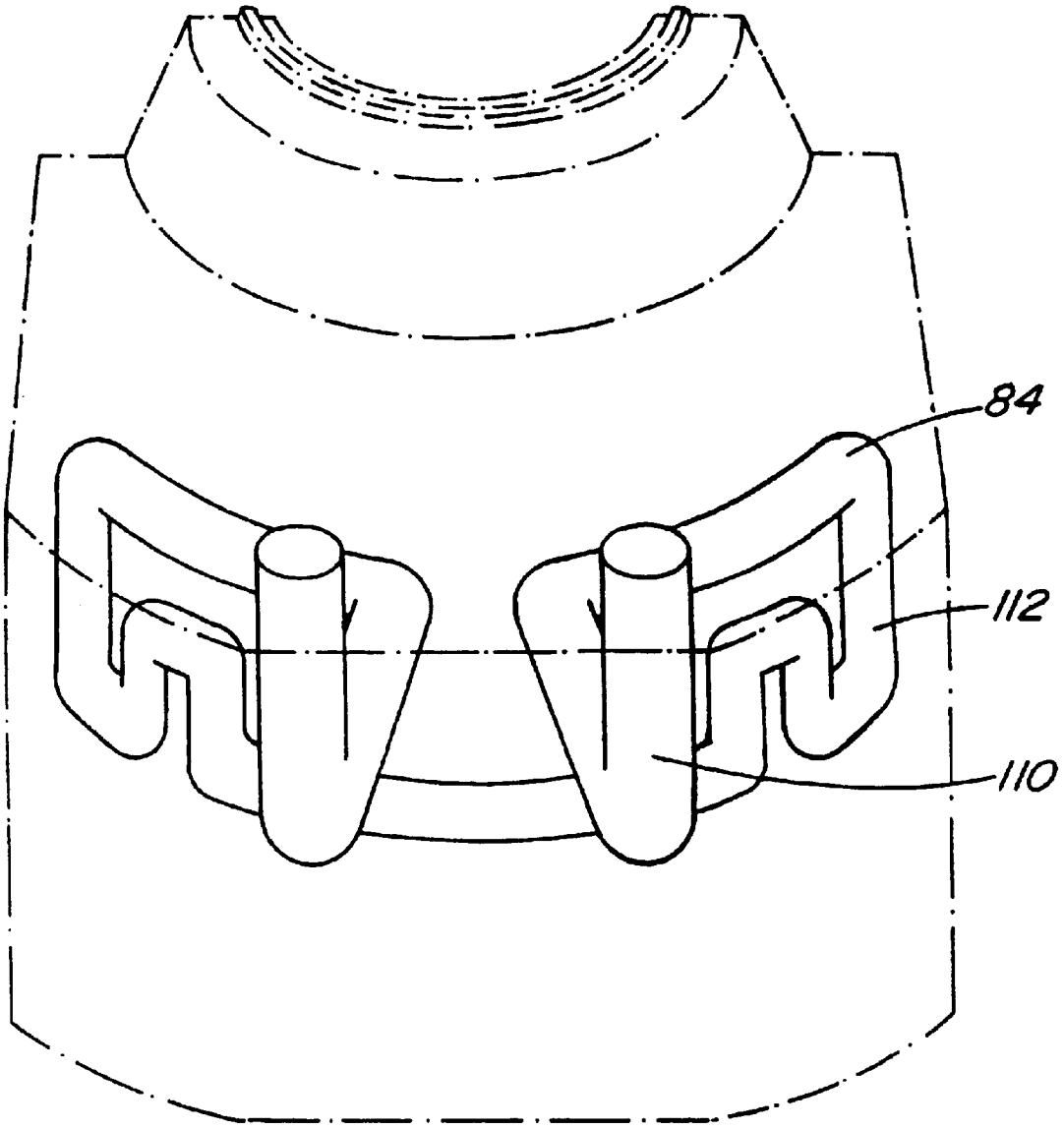
FIG. 14 is a schematic view showing the configuration of the cooling fluid conduit in each of the pair of thread split inserts.

Each thread split insert 12, 14 has a front end 26, a rear end 28 and flat inner aligned faces 30, 32 extending on opposite sides of a curved inner surface 34. During molding of the bottled preforms 10, the thread split inserts 12, 14 are mounted in a mold with the respective flat inner faces 30, 32 of the thread split inserts 12, 14 abutting, whereby as seen in FIG. 13 the curved inner surfaces 34 of the thread split inserts 12, 14 combine to form an opening 35 therethrough shaped to mold the outer surface 18 of the neck portion 16 of the preform 10. The curved inner surfaces 34 of the thread split inserts 12, 14 each have a semi-circular groove 36 to form the ring collar 20 and a threaded portion 38 extending between the semi-circular groove 36 and the rear end 28 to form the threads 22.

The bottle preform 10 has an elongated cylindrical portion 40 and may include a slightly tapered portion 42 extending from the neck portion 16. As is well known, the cylindrical portion 40 and tapered portion 42 are later enlarged by stretching and then blow molding to form a beverage bottle. After the preform 10 is stretch-blow molded and the resulting bottle is filled with a suitable beverage, a removable threaded cap (not shown) is screwed on to the threads 22 to close the bottle. The ring collar 20 is used in the stretch-blow molding process, but is also used to assist in ejecting the preform 10.

Reference will now be made to the rest of the drawings in describing the method of making the pair of thread split inserts 12, 14 by casting a hollow inner part 44, machining a hollow outer part 46, integrally brazing the hollow inner part 44 and the hollow outer part 46 together, and then cutting the integral hollow inner and outer parts 44, 46 in half to form the pair of thread split inserts 12, 14.

Figure 2:
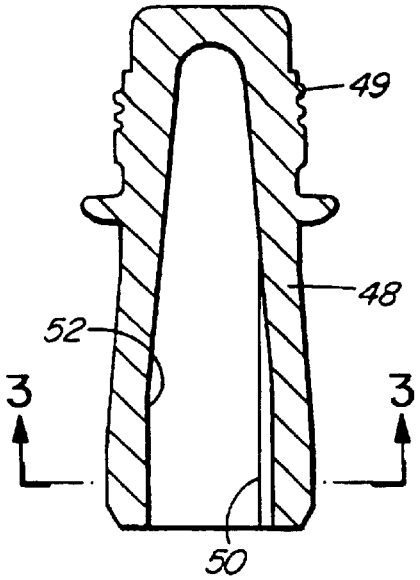
FIG. 2 is a sectional view of a ceramic core.
Figure 3:
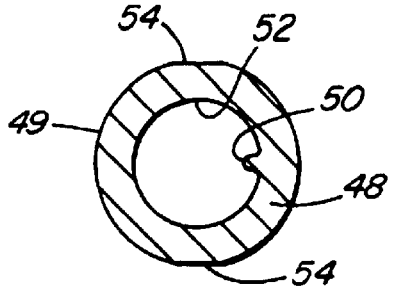
FIG. 3 is a sectional view taken along 3—3 in FIG. 2.
Figure 4:
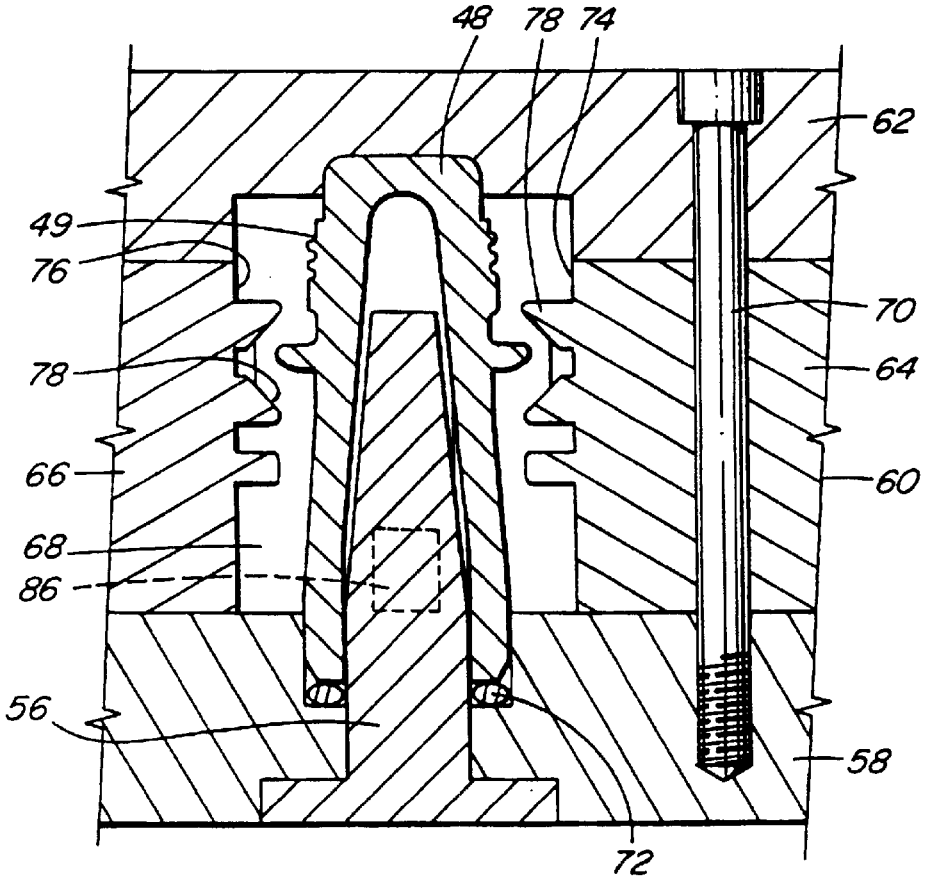
FIG. 4 is a sectional view of a wax mold having a cavity in the shape of an inner part of a pair of thread split inserts.

Reference will first be made to FIGS. 2–7 to describe how the hollow inner part 44 is made by a conventional lost wax or investment casting process. First, as seen in FIGS. 2 and 3, a hollow core 48 is injection molded of a suitable material such as ceramic. As seen in FIG. 3, the ceramic core 48 is made with an outer surface 49 shaped to form the inner surfaces 34 of the thread split inserts 12, 14. The ceramic core 48 also has a locating ridge 50 on its inner surface 52 and is generally cylindrical, but has two flat sections 54 which are long enough to allow the integral thread split inserts 12, 14 to be circular after some material is lost when they are cut in half. As seen in FIG. 4, the hollow ceramic core 48 is then placed on a mounting pin 56 extending upwardly from a bottom plate 58 of a wax mold 60. The locating ridge 50 fits in a groove (not shown) on the mounting pin 56 to ensure the ceramic core 48 is properly oriented. The wax mold 60 has a top plate 62 and two inserts 64, 66 which slide inwardly together to form a cavity 68 extending between them around the hollow ceramic core 48. After the mold 60 is closed, screws 70 are inserted to hold the plates 58, 62 and the inserts 64, 66 together during molding. A resilient O-ring 72 extending around the mounting pin 56 ensures the ceramic core 48 is positioned at the top of the mold 60. The sliding inserts 64, 66 are made having inner surfaces 74, 76 shaped with a configuration of interconnected ridges 78 extending therefrom to provide the hollow inner part 44 of the pair of thread split inserts 12, 14 with a generally cylindrical outer surface 80 with the same configuration of interconnected grooves 82 therein to form inner portions 84 of two cooling fluid conduits extending around the curved inner surface 34 of the thread split inserts 12, 14. Molten wax is then injected into the cavity 68 through a large casting gate 86. After the wax has cooled and solidified, the mold 60 is opened leaving a wax part 88 having the same shape as the hollow inner part 44 of the pair of thread split inserts 12, 14 extending around the ceramic core 48.

Figure 5:
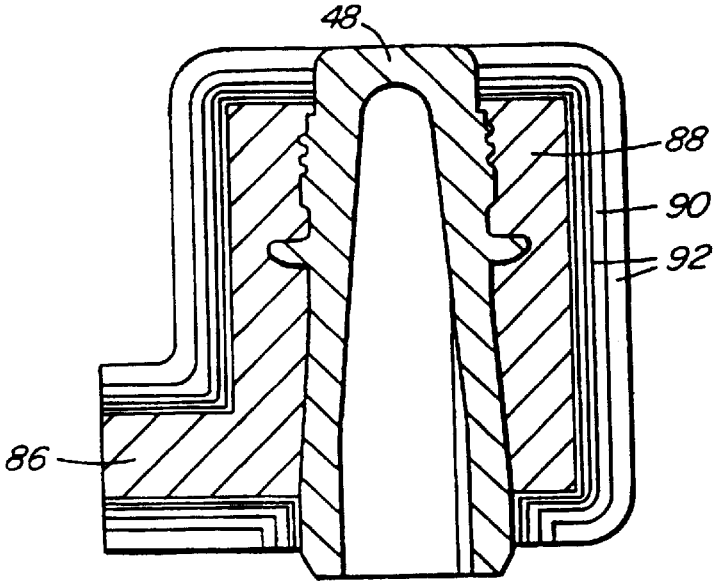
FIG. 5 is a sectional view showing the wax covered by ceramic coatings during investment casting.
Figure 6:
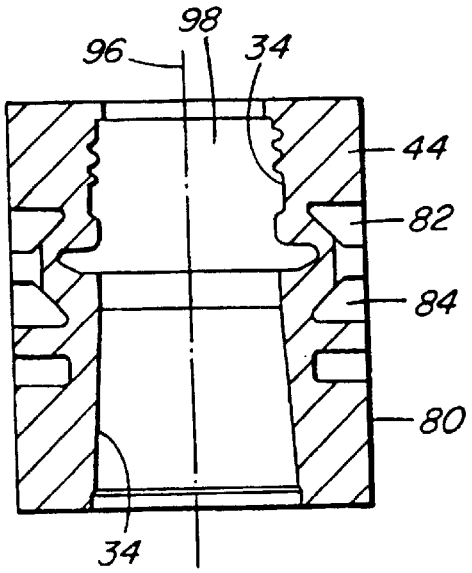
FIG. 6 is a sectional view showing the cast inner part.
Figure 7:
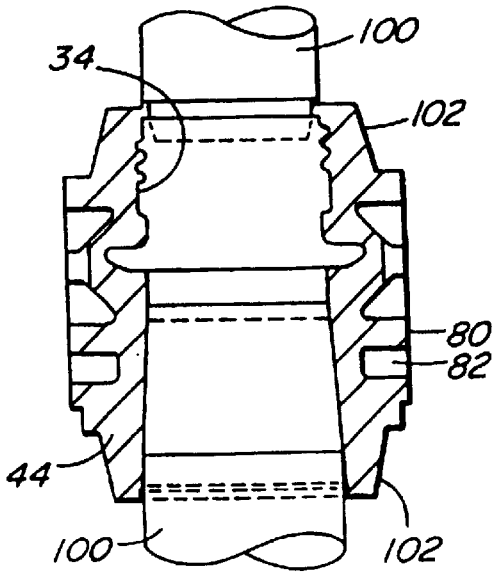
FIG. 7 is a sectional view showing the inner part after machining.

As seen in FIG. 5, the wax part 88 is dipped repeatedly in a bath (not shown) of ceramic material which hardens to form an outer shell 90 of several layers 92 of ceramic material. The coated wax part 88 is then heated in an autoclave to remove the wax and the empty shell 90 is then filled with a suitable molten material such as steel through the gate 86. After cooling, the outer shell 90 and the ceramic core 48 are removed leaving the hollow raw cast inner part 44 of the pair of thread split inserts 12, 14 extending around a central longitudinal axis 96 as seen in FIG. 6. As can be seen, the cast hollow inner part 44 has the generally cylindrical outer surface 80 with the grooves 82 therein to partially form the inner portions 84 of the two cooling conduits. It also has a central opening 98 with the same shape as the ceramic inner core 48. This process of, making the raw cast inner part 44 is a conventional lost wax or investment casting process. Although only one hollow inner part 44 is shown for ease of illustration, normally the wax parts 88 and the hollow inner parts 44 are made in interconnected arrangements or trees to expedite the process. The raw cast inner part 44 seen in FIG. 6 is then mounted on spindles 100 as seen in FIG. 7 and machined to make the outer surface 80 a predetermined size and to form tapered end portions 102.

Figure 8:
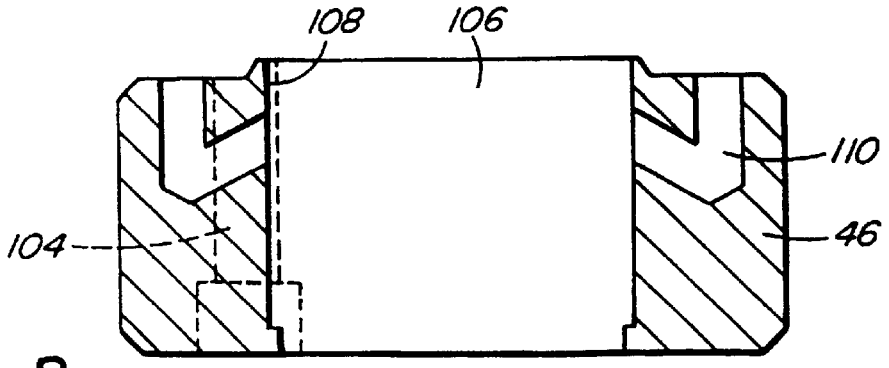
FIG. 8 is a sectional view of a machined outer part of the pair of thread split inserts.
Figure 9:
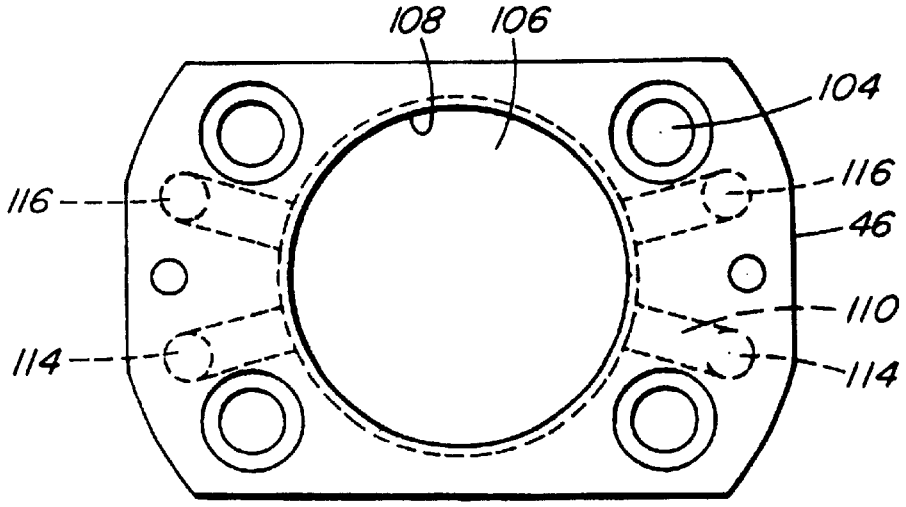
FIG. 9 is a bottom view of the outer part seen in FIG. 8.

Reference is now made to FIGS. 8 and 9 which show the hollow outer part 46 which is machined of a suitable material such as tool steel. As can be seen, the hollow outer part 46 is made with four retaining bolt holes 104 as well as a central opening 106 extending therethrough with an inner surface 108. The inner surface 108 is made to fit around the outer surface 80 of the hollow inner part 44. The hollow outer part 46 is also machined to have outer portions 110 of two cooling fluid conduits which are made to align respectively with the inner portions 84 of the two cooling fluid conduits in the outer surface 80 of the inner part 84.

Figure 10:
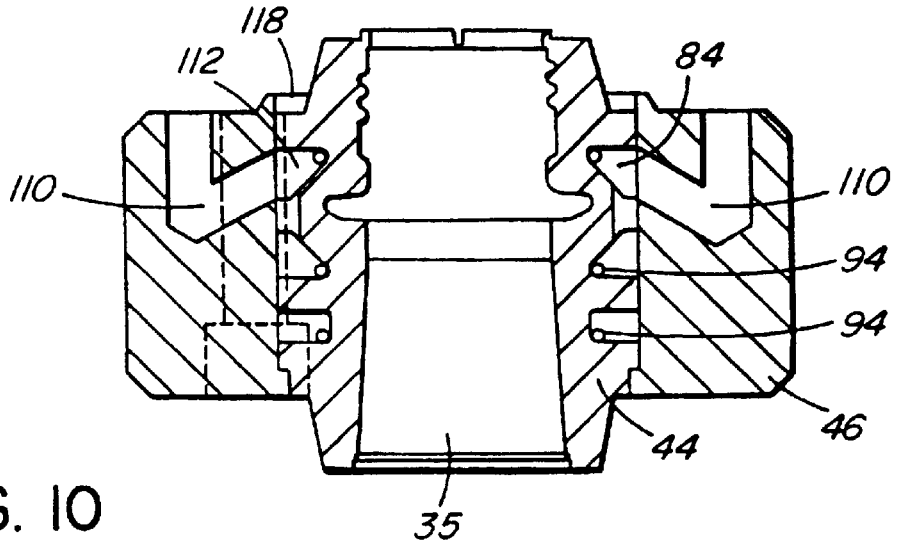
FIG. 10 is a sectional view of the outer part mounted around the inner part ready for brazing in a vacuum furnace.
Figure 11:
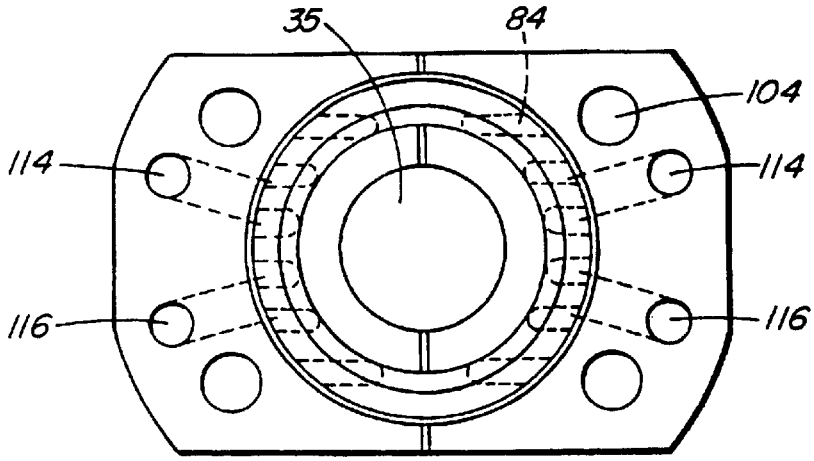
FIG. 11 is a plan view of the parts shown in FIG. 10.

Nickel brazing paste 94 is applied to the inner portions 84 of the cooling conduits and the hollow inner part 44 is inserted into the central opening 106 through the hollow outer part 46 to form the pair of thread split inserts 12, 14. As can be seen in FIGS. 10 and 11, this completes the inner portions 84 of the cooling conduits in the hollow inner part 44 which are aligned with the corresponding outer portions 110 of the cooling conduits in the hollow outer part 46. This produces the two cooling conduits 112 through which cooling water flows from inlets 114 to outlets 116 on the front end 26. Nickel brazing material is inserted into circular groove 118 and the assembled hollow inner and hollow outer parts 44, 46 are gradually heated in a vacuum furnace (not shown) to a temperature of approximately 1925° F. which is above the melting point of the nickel alloy. As the furnace is heated, it is evacuated to a relatively high vacuum to remove substantially all of the oxygen and then partially backfilled with an inert gas such as argon or nitrogen. When the melting point of the nickel is reached, it melts and flows by capillary action between the hollow inner part 44 and the hollow outer part 46 to integrally braze them together to form the pair of thread split inserts 12, 14. Brazing them together this way in the vacuum furnace provides a metallurgical bonding between them to maximize their strength and prevent leakage of the cooling water from the cooling conduits 112.

Figure 12:
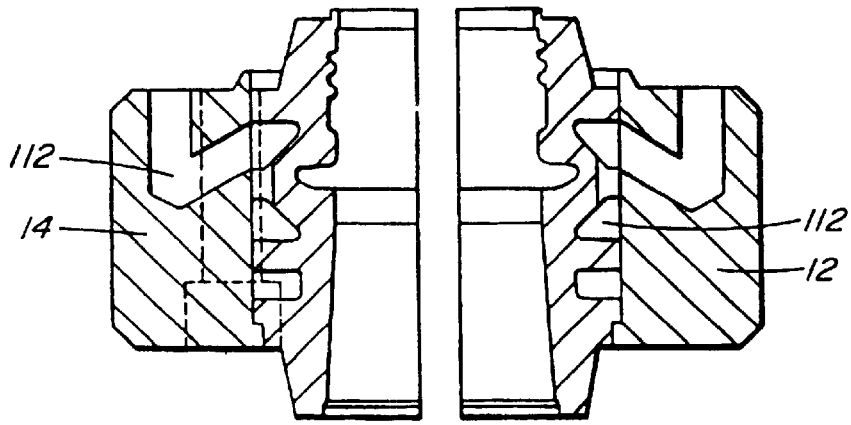
FIG. 12 is a plan view of the integrally brazed two parts cut in half to form the pair of thread split inserts.

After removal of the integral pair of thread split inserts 12, 14 from the vacuum furnace, they are cut in half along the longitudinal axis 96 in an electrical wire-cut machine to form the two separate thread split inserts 12, 14 shown in FIG. 12. As shown, they are cut in the correct plane to have one of the cooling conduits 112 in each of the thread split inserts 12, 14. The pair of thread split inserts 12, 14 are then machined to provide a good outer finish and the tapered portions 120, 122 at their front and rear ends 26, 28. During molding the pair of thread split inserts 12, 14 are secured tightly together by the tapered flange portions 120, 122 being engaged by the rest of the mold (not shown). In this position, the matching flat inner surfaces 30, 32 abut and the curved inner surfaces 34 of the pair of thread split inserts 12, 14 combine to form the opening 35 therethrough shaped to mold the outer surface 18 of the neck portion 16 of the preform 10. Of course, during molding an elongated cylindrical core (not shown) extends through this opening 35 to form the inner surface 124 of the preform 10.

In use in a multi-cavity mold, a number of pairs of thread split inserts 12, 14 made according to the invention are mounted in a conventional mold. A supply of cooling water or other suitable cooling fluid is connected to the inlet 116 of the cooling fluid conduit 112 in each thread split insert 12, 14 to circulate through each cooling fluid conduit 112. Pressurized melt from a molding machine is then injected into the cavity in the opening 35 through each pair of thread split inserts 12, 14 according to a predetermined injection cycle. After the cavities are full, injection pressure is held momentarily to pack and then released. After a short cooling period, the mold is opened to eject each preform 10. This is done by the preform 10 first being ejected from the core and the two thread split inserts 12, 14 then separated to drop the preform 10 onto a conveyor belt or cooling plate. Of course, this requires that the two thread split inserts 12, 14 be separated enough to release the ring collar 20 and threads 22 of the preform 10. After ejection, the mold is closed and injection pressure is reapplied to refill the cavity and the injection cycle is repeated continuously.

While the description of the method of making the pair of thread split inserts 12, 14 has been given, with respect to a preferred embodiment, it will be evident that various other modifications are possible without departing from the scope of the invention as understood by those skilled in the art and as defined in the following claims.

The embodiments of the invention in which an exclusive property or privilege is claimed is defined as follows:

1. A method of making a pair of [thread] split inserts used in injection molding elongated hollow [bottle] preforms, each preform having a neck portion with an outer surface [forming a ring collar and threads extending between an open end and the ring collar], each [thread] split insert having [a front end, a rear end and] first and second [flat] inner aligned faces extending on opposite sides of a curved inner surface, the [thread] split inserts to be mounted together in a mold with the respective [flat] inner faces of the [thread] split inserts abutting, wherein the curved inner surfaces of the [thread] split inserts combine to form an opening therethrough shaped to mold the outer surface of the neck portion of the preform, [the curved inner surfaces of the thread split inserts each have a semicircular groove to form the ring collar and a threaded portion extending between the semicircular groove and the rear end to form the threads,] comprising the steps of[;]

[(a) injection molding a ceramic core having a predetermined shape,]

[(b) casting wax around the ceramic core in the shape of an inner part of the pair of thread split inserts,]

[(c) investment]:

(*a*) *casting a suitable metal in a mold* [to replace the wax around the ceramic core] to form a hollow inner part of the pair of [thread] split inserts extending around a central longitudinal axis, said inner part having [a generally cylindrical] outer surface with grooves therein to partially form inner portions of two cooling fluid conduits, each cooling fluid conduit to extend around the curved inner surface of one of the [thread] split inserts[, (d) machining the cast inner part to make the outer surface a predetermined size, (e)] ;

(*b*) making a hollow outer part of the pair of [thread] split inserts of a suitable metal having a predetermined shape with an opening therethrough having an inner surface which fits around the outer surface of the inner part and outer portions of the two cooling conduits extending from the opening therethrough to respective inlets and outlets[, (f)] (*c*) mounting the outer part around the inner part with the inner and outer portions of the two cooling fluid conduits aligned[, applying brazing material between the inner part and the outer part, and heating the assembled inner part and outer part in a vacuum furnace to integrally braze the inner part and the outer part together,] and

[(g)] (*d*) cutting the [integral] inner and outer parts [in half along the central longitudinal axis] to form the pair of [thread] split inserts, each of the [thread] split inserts having one of the cooling fluid conduits therein.

2. [A] *The* method of making a pair of [thread] split inserts as claimed in claim 1, wherein the outer part of the pair of [thread] split inserts is made by machining.

3. [A] *The* method of making a pair of [thread] split inserts as claimed in claim 2, wherein the [integrally brazed] inner and outer parts of the [thread] split inserts are cut in half by an electrical discharge machine.

4. [A] *The* method of making a pair of [thread] split inserts as claimed in claim 3, further comprising *the step of:* (*e*) machining the [brazed] inner and outer parts of the [thread] split inserts to provide the [thread] split inserts with a desired finish and shape.

*5. A method of making a pair of split inserts for use in injection molding, comprising the steps of:*

(*a*) *casting a hollow inner part;*

(*b*) *machining a hollow outer part;*

(*c*) *integrally brazing the hollow inner part and the hollow outer part together; and*

(*d*) *cutting the integral hollow inner and outer parts to form the pair of split inserts.*

* * * * *